United States Patent
Nagoshi et al.

(10) Patent No.: US 10,697,038 B2
(45) Date of Patent: Jun. 30, 2020

(54) GRAIN ORIENTED ELECTRICAL STEEL SHEET, METHOD FOR MANUFACTURING GRAIN ORIENTED ELECTRICAL STEEL SHEETS, METHOD FOR EVALUATING GRAIN ORIENTED ELECTRICAL STEEL SHEETS, AND IRON CORE

(71) Applicant: JFE STEEL CORPORATION, Tokyo (JP)

(72) Inventors: Masayasu Nagoshi, Kawasaki (JP); Tomohiro Matsushima, Chiba (JP); Makoto Watanabe, Kurashiki (JP); Shigehiro Takajo, Los Alamos, NM (US); Toshito Takamiya, Kurashiki (JP); Masanori Uesaka, Kurashiki (JP); Takashi Terashima, Kurashiki (JP)

(73) Assignee: JFE STEEL CORPORATION, Tokyo (JP)

(*) Notice: Subject to any disclaimer, the term of this patent is extended or adjusted under 35 U.S.C. 154(b) by 393 days.

(21) Appl. No.: 15/514,746

(22) PCT Filed: Sep. 11, 2015

(86) PCT No.: PCT/JP2015/004629
§ 371 (c)(1),
(2) Date: Mar. 27, 2017

(87) PCT Pub. No.: WO2016/047077
PCT Pub. Date: Mar. 31, 2016

(65) Prior Publication Data
US 2017/0240987 A1 Aug. 24, 2017

(30) Foreign Application Priority Data

Sep. 26, 2014 (JP) .................................. 2014-195916
Sep. 26, 2014 (JP) .................................. 2014-195917

(51) Int. Cl.
*C21D 9/46* (2006.01)
*G01N 21/62* (2006.01)
(Continued)

(52) U.S. Cl.
CPC .................. *C21D 9/46* (2013.01); *C21D 8/12* (2013.01); *C21D 8/1233* (2013.01);
(Continued)

(58) Field of Classification Search
CPC .......... C21D 9/46; C21D 8/12; C21D 8/1233; C21D 8/1255; C21D 8/1272;
(Continued)

(56) References Cited

U.S. PATENT DOCUMENTS 6,613,160 B2   9/2003   Ushigami et al.
7,727,644 B2   6/2010   Watanabe et al.
(Continued)

FOREIGN PATENT DOCUMENTS

EP   2 799 566 A1   11/2014
EP   2 980 566 A1   2/2016
(Continued)

OTHER PUBLICATIONS

Dec. 22, 2015 Search Report issued in International Patent Application No. PCT/JP2015/004629.
(Continued)

*Primary Examiner* — Jonathan C Langman
(74) *Attorney, Agent, or Firm* — Oliff PLC

(57) ABSTRACT

A grain oriented electrical steel sheet comprising a grain oriented electrical steel sheet having a surface and a forsterite film formed on the surface of the steel sheet, wherein a total area percentage of defective parts scattered on the forsterite film is less than 1.5% relative to a surface area of the forsterite film when viewed from above the surface, and methods for evaluating a grain oriented electrical steel sheet
(Continued)

comprising a grain oriented electrical steel sheet having a surface and a forsterite film formed on the surface of the steel sheet.

6 Claims, 6 Drawing Sheets

(51) Int. Cl.
    *H01F 1/18*     (2006.01)
    *C21D 8/12*     (2006.01)
    *G01N 23/225*     (2018.01)
    *H01F 1/16*     (2006.01)
    *C22C 38/02*     (2006.01)
    *G01N 23/2251*     (2018.01)
    *H01F 27/245*     (2006.01)
    *H02K 1/02*     (2006.01)
    *H02K 1/06*     (2006.01)

(52) U.S. Cl.
CPC ......... *C21D 8/1255* (2013.01); *C21D 8/1272* (2013.01); *C21D 8/1283* (2013.01); *C21D 8/1288* (2013.01); *C22C 38/02* (2013.01); *G01N 21/62* (2013.01); *G01N 23/225* (2013.01); *G01N 23/2251* (2013.01); *H01F 1/16* (2013.01); *H01F 1/18* (2013.01); *H01F 27/245* (2013.01); *H02K 1/02* (2013.01); *H02K 1/06* (2013.01)

(58) Field of Classification Search
CPC .... C21D 8/1283; C21D 8/1288; C22C 38/02; G01N 21/62; G01N 23/225; G01N 23/2251; H01F 1/16; H01F 1/18; H01F 27/245; H02K 1/02; H02K 1/06
See application file for complete search history.

(56) References Cited

U.S. PATENT DOCUMENTS

| | | | |
|---|---|---|---|
| 2008/0190520 A1* | 8/2008 | Watanabe | C21D 8/12 148/537 |
| 2013/0098508 A1 | 4/2013 | Yamaguchi et al. | |
| 2013/0167982 A1 | 7/2013 | Yamaguchi et al. | |

FOREIGN PATENT DOCUMENTS

| | | |
|---|---|---|
| JP | H05-179347 A | 7/1993 |
| JP | H08-100218 A | 4/1996 |
| JP | H08-143970 A | 6/1996 |
| JP | H09-184017 A | 7/1997 |
| JP | H11-335742 A | 12/1999 |
| JP | 2000-114064 A | 4/2000 |
| JP | 2001-303215 A | 10/2001 |
| JP | 2003-157789 A | 5/2003 |
| JP | 2003-166019 A | 6/2003 |
| JP | 2003-318039 A | 11/2003 |
| JP | 2006-137972 A | 6/2006 |
| JP | 2008-260668 A | 10/2008 |
| JP | 2009-270129 A | 11/2009 |
| JP | 2011-68968 A | 4/2011 |
| JP | 2011-133446 A | 7/2011 |
| JP | 2012031519 A | 2/2012 |
| WO | 2012/001953 A1 | 1/2012 |
| WO | 2013/099274 A1 | 7/2013 |
| WO | 2014/157713 A1 | 10/2014 |

OTHER PUBLICATIONS

Mar. 1, 2018 Search Report issued in European Patent Application No. 15843551.1.
Weiderfeller B. et al., "Characterization of Surface Defects Produced in Transformer Sheets by Nd: YAG Radiation to Reduce Electrical Losses," Lasers in Engineering, Gordan and Breach Science Publishers, vol. 3, pp. 87-98, Jan. 1, 1994.
Shinno I. et al., "Deformation-Sensitive Luminescence of Forsterite (MgSiO) Shocked up to 82 GPa," Journal of Luminescence, vol. 87, pp. 1292-1294, Jan. 1, 2000.
Gucsik A. et al., Cathodoluminescence Microcharacterization of Forsterite in the Chondrule Experimentally Grown Under Super Cooling, Journal of Luminescence, vol. 132, pp. 1041-1047, Dec. 1, 2011.
Yacobi B.G. et al., "Cathodoluminescence Scanning Electron Microscopy of Semiconductors," Journal of Applied Physics, American Institute of Physics, vol. 59, pp. R1-R24, Feb. 1, 1986.
Baun, et al., "Applications of Surface Analysis Techniques to Studies of Adhesion," Applications of Surface Science, Elsevier BV, vol. 4, pp. 291-306, Apr. 1, 1980.
Aug. 28, 2018 Korean Office Action issued in Korean Patent Application No. 10-2017-7008090.
Jun. 5, 2018 Extended European Search Report issued in European Patent Application No. 15843551.1.
Mar. 5, 2018 Office Action issued in Chinese Patent Application No. 201580052238.1.
May 24, 2019 Extended Search Report isssued in European Patent Application No. 19159676.6.
Feb. 7, 2019 Office Action issued in Korean Patent Application No. 10-2017-7008090.
Mar. 7, 2017 Office Action issued in Japanese Patent Application No. 2016-504406.
Nov. 8, 2018 Notice of Allowance issued in Korean Patent Application No. 10-2018-7030928.
Jul. 16, 2019 Office Action issued in Chinese Patent Application No. 201580052238.1.
Apr. 28, 2020 Office Action issued in U.S. Appl. No. 16/432,274.

* cited by examiner

GRAIN ORIENTED ELECTRICAL STEEL SHEET, METHOD FOR MANUFACTURING GRAIN ORIENTED ELECTRICAL STEEL SHEETS, METHOD FOR EVALUATING GRAIN ORIENTED ELECTRICAL STEEL SHEETS, AND IRON CORE

TECHNICAL FIELD

This application relates to a grain oriented electrical steel sheet, a method for manufacturing grain oriented electrical steel sheets, a method for evaluating grain oriented electrical steel sheets, and an iron core.

BACKGROUND

Grain oriented electrical steel sheets are mainly used as iron core materials for transformers, electrical equipment motors, and so on. From the point of view of energy saving, grain oriented electrical steel sheets having excellent magnetization characteristics, in particular, grain oriented electrical steel sheets that provide low iron loss are desired.

In the manufacturing of such grain oriented electrical steel sheets, a steel slab including elements for forming an inhibitor, for example, MnS, MnSe or AlN, that is necessary to induce secondary recrystallization (for example, the elements in the case of MnS are Mn and S) is hot rolled to form a steel sheet. The steel sheet is annealed as required, subsequently cold rolled one time, or two or more times with intermediate annealing after each pass to attain a final sheet thickness, then decarburized annealed, coated with an annealing separator such as MgO, and subjected to final finishing annealing.

In most cases, on the surface of a grain oriented electrical steel sheet manufactured by the above process, a ceramic insulating film called forsterite ($Mg_2SiO_4$) (also written as forsterite film) is formed. Usually, a tension coating is formed on top of this film to attain enhanced insulating properties and to give a tension to the steel sheet.

When such grain oriented electrical steel sheets are used as layered iron cores, the forsterite film and the tension coating film provide electrical insulation between layers of the steel sheet and contribute effectively to reducing the eddy current. One type of such layered iron cores is stacked iron cores in which a plurality of flat sheets that have been shorn or punched are piled on top of one another (see, for example, Patent Literature 1). Another type is wound iron cores that include a series of circles produced by coiling of a flat sheet (see, for example, Patent Literature 2). If the adhesion properties of a forsterite film are low, the forsterite film is easily exfoliated from the steel sheet surface at punched ends of a stacked iron core or at bent portions in a wound iron core. In the presence of exfoliation in the forsterite film, the electrical insulation between layers of the steel sheet is lowered by tightening during the fabrication of the iron core. Poor electrical insulation causes a local generation of heat when the layered iron core is used in a transformer or a motor, giving rise to a decrease in the performance of electrical equipment and, even worse, a risk of accidents such as dielectric breakdown. Further, poor adhesion between the steel sheet surface and the forsterite film facilitates the exfoliation of the forsterite film not only during the deformation of the steel sheet but also by the collision of foreign objects. This exfoliation usually occurs at the interface between the steel sheet and the forsterite film. The exfoliation in forsterite films possibly leads to corrosion of the steel sheets during the period between the manufacturing of the steel sheets and the fabrication of iron cores. The corrosion of steel sheets decreases the commercial value of the grain oriented electrical steel sheets.

To achieve a further reduction in the iron loss of grain oriented electrical steel sheets, a method for magnetic domain refining has been presented and been in practical use. In this method, magnetic domains are subdivided by forming defects such as grooves on the surface of a final cold-rolled steel sheet, or by introducing local strains into the steel sheet surface by the irradiation of an electron beam (electron ray) or a laser beam after secondary recrystallization annealing. Of these magnetic domain refining techniques, the introduction of local strains takes place after the formation of a forsterite film. If the forsterite film has low adhesion properties, the forsterite film and further the tension coating are exfoliated together from the steel sheet depending on the conditions under which an electron beam or a laser beam is irradiated. The exfoliation of these films from the steel sheet results in a significant decrease in the insulating properties and corrosion resistance of the grain oriented electrical steel sheet. A countermeasure to this problem is to apply another coating in order to cover portions exposed by the exfoliation. However, this approach not only increases the manufacturing costs of grain oriented electrical steel sheets, but also causes the tension coating to undergo baking, which relaxes the local strains and significantly decreases the effect of magnetic domain refining.

It is of great importance to increase the adhesion properties between a steel sheet and a forsterite film and to minimize the occurrence of exfoliation. In particular, high-grade grain oriented electrical steel sheets which are processed by magnetic domain refining treatment are required to have strong resistance to exfoliation, that is, to have high adhesion between a forsterite film and the steel sheet surface.

A forsterite film also serves to enhance magnetic characteristics by giving a tensile stress to the surface of a steel sheet. Thus, the film is demanded to have excellent film adhesion and to have a high performance in giving a tensile stress to the steel sheet surface. Here, the term "film adhesion" means adhesion properties between the forsterite film and the surface of the steel sheet.

CITATION LIST

Patent Literature

Patent Literature 1: Japanese Unexamined Patent Application Publication No. 2000-114064
Patent Literature 2: Japanese Unexamined Patent Application Publication No. 2003-318039

SUMMARY

Solution to the Problems

It is, however, difficult to form a forsterite film having high adhesion to the surface of a steel sheet. This difficulty is ascribed to insufficient understanding of factors that determine the adhesion properties of a forsterite film. While, for example, the adhesion properties of a forsterite film are conventionally evaluated by an adhesion test (or a peeling test), a forsterite film that has been irradiated with electron ray often exhibits different adhesion properties than a tendency obtained by the usual adhesion test (or peeling test). Another problem is that the adhesion test (or the peeling test)

is a destructive testing and thus cannot be implemented on a production line to evaluate and control the entirety of a coil.

The first aspect of the disclosed embodiments is to provide a grain oriented electrical steel sheet having excellent adhesion properties between a forsterite film and the steel sheet surface, an iron core produced by using the grain oriented electrical steel sheet, and a method for manufacturing such grain oriented electrical steel sheets.

The second aspect of the disclosed embodiments pertains to an evaluation of a forsterite film. Specifically, the first object is to provide an evaluation method capable of evaluating the adhesion properties between a forsterite film and the surface of a steel sheet; the second object is to provide an evaluation method capable of evaluating the above adhesion properties and also the amount of forsterite; the third object is to provide a method for manufacturing grain oriented electrical steel sheets including a step of performing an evaluation by any of the above evaluation methods; and the fourth object is to provide a grain oriented electrical steel sheet screened by any of the above evaluation methods, and an iron core produced using the grain oriented electrical steel sheet.

Solution to Problem

The present inventors have developed a method which can evaluate the distribution of a forsterite film by a simple and non-destructive analysis of the surface of the forsterite film or the surface of a tension coating disposed on the forsterite film.

The method relies on the detection of signals of cathodoluminescence (hereinafter, abbreviated as CL) or electron-beam-excitation light emitted from a forsterite film upon the irradiation of a grain oriented electrical steel sheet with an electron beam. That is, the present inventors have found that the distribution of a forsterite film on a grain oriented electrical steel sheet can be derived by scanning the surface and cross sections of the grain oriented electrical steel sheet with an electron beam with use of a scanning electron microscope (hereinafter, abbreviated as SEM) fitted with an optical evaluation unit (an optical evaluation unit including sections such as an optical detection section), and observing a CL image that is created based on the signals of the electron-beam-excitation light emitted from the forsterite film.

Further, using the above method, the present inventors have intensively studied relationships between the distribution of a forsterite film and the film adhesion (the adhesion properties between the steel sheet surface and the forsterite film), and have found that grain oriented electrical steel sheets having high film adhesion can be obtained by controlling the ratio of areas covered by the forsterite film to a specific range, thus completing the first aspect of the disclosed embodiments.

Further, the present inventors have measured CL spectra with respect to various grain oriented electrical steel sheets having a forsterite film, and have studied in detail the correlation of the spectra with the properties of the forsterite films. As a result, it has been observed that emission centered at near 410 nm wavelength (emission peak A), emission at near 500 nm wavelength (emission peak B) and emission centered at near 640 nm wavelength (emission peak C) are present. The present inventors have found that while the above emission peaks appear at similar respective wavelengths among the various grain oriented electrical steel sheets, the emission intensities of the peaks are widely different. The inventors have revealed that this fact is closely related with properties such as the adhesion between the forsterite film and the steel sheet surface, and the amount of the film formed (the amount of forsterite), and have found that the properties of the forsterite film can be quantitatively evaluated using the peak intensities or the ratio of the peak intensities. The present inventors have further found that a preferred range of the properties of the forsterite film can be specified using a relationship between the intensity ratio of the emission peaks and the amount of forsterite. Based on these findings, the present inventors have completed the second aspect of the disclosed embodiments.

The disclosed embodiments have been completed by extensive studies based on the above findings. A gist of these embodiments is described below.

[1] A grain oriented electrical steel sheet having a forsterite film on a steel sheet, wherein the forsterite film as viewed from above the surface has a total area percentage of defective parts scattered on the film of less than 1.5% relative to the surface area of the forsterite layer.

[2] The grain oriented electrical steel sheet described in [1], wherein the total area percentage of defective parts on the forsterite film is not less than 0.1%.

[3] The grain oriented electrical steel sheet described in [1] or [2], wherein at least part of the defective parts is streaky.

[4] The grain oriented electrical steel sheet described in any of [1] to [3], wherein magnetic domain refining treatment has been performed on the surface of the grain oriented electrical steel sheet.

[5] An iron core including layers of the grain oriented electrical steel sheet described in any of [1] to [4].

[6] A method for manufacturing grain oriented electrical steel sheets having a forsterite film on a steel sheet, the method including
a screening step of screening a grain oriented electrical steel sheet based on whether or not the total area percentage of defective parts scattered on the forsterite film as viewed from above the surface is within a prescribed range.

[7] The method for manufacturing grain oriented electrical steel sheets described in [6], further including a magnetic domain refining step of performing magnetic domain refining treatment on the surface of a grain oriented electrical steel sheet screened as acceptable in the screening step.

[8] A method for evaluating a grain oriented electrical steel sheet having a forsterite film on a steel sheet to estimate the adhesion between the forsterite film and the surface of the steel sheet, the method including
irradiating the surface of the grain oriented electrical steel sheet with an electron beam,
dispersing the consequent emission into a spectrum, and
evaluating the adhesion between the forsterite film and the surface of the steel sheet using at least one of the intensity of emission peak A and/or emission peak B observed at 380 to 600 nm wavelengths, and the following intensity ratio:
(Intensity Ratio)
the intensity ratio is any of $I_a/I_c$, $I_b/I_c$, and $(I_a+I_b)/I_c$, wherein
$I_a$ is the intensity of emission peak A, $I_b$ is the intensity of emission peak B observed at a longer wavelength than the emission peak A, and $I_c$ is the intensity of emission peak C observed at a wavelength of 600 to 665 nm.

[9] A method for evaluating a grain oriented electrical steel sheet having a forsterite film on a steel sheet to estimate the adhesion between the forsterite film and the surface of the steel sheet, and the amount of forsterite, the method including irradiating the surface of the grain oriented electrical steel sheet with an electron beam, dispersing the consequent emission into a spectrum, evaluating the adhesion between the forsterite film and the surface of the steel sheet using at least one of the intensity of emission peak A and/or emission peak B observed at 380 to 600 nm wavelengths, and the intensity ratio described below, and evaluating the amount of forsterite in the forsterite film using the intensity of emission peak C observed at a wavelength of 600 to 665 nm;

(Intensity Ratio)

the intensity ratio is any of Ia/Ic, Ib/Ic, and (Ia+Ib)/Ic, wherein Ia is the intensity of emission peak A, Ib is the intensity of emission peak B observed at a longer wavelength than the emission peak A, and Ic is the intensity of emission peak C.

[10] The method for evaluating a grain oriented electrical steel sheet described in [8] or [9], wherein the evaluation uses the intensity of emission peak A observed at 380 to 450 nm and/or Ia/Ic.

[11] A method for manufacturing grain oriented electrical steel sheets having a forsterite film on a steel sheet, the method including a screening step of screening a grain oriented electrical steel sheet after the formation of a forsterite film by irradiating the surface with an electron beam, dispersing the consequent emission into a spectrum, and evaluating the adhesion between the forsterite film and the surface of the steel sheet using at least one of the intensity of emission peak A and/or emission peak B observed at 380 to 600 nm wavelengths, and the following intensity ratio:

(Intensity Ratio)

the intensity ratio is any of Ia/Ic, Ib/Ic, and (Ia+Ib)/Ic, wherein Ia is the intensity of emission peak A, Ib is the intensity of emission peak B observed at a longer wavelength than the emission peak A, and Ic is the intensity of emission peak C observed at a wavelength of 600 to 665 nm.

[12] A method for manufacturing grain oriented electrical steel sheets having a forsterite film on a steel sheet, the method including a screening step of screening a grain oriented electrical steel sheet after the formation of a forsterite film by irradiating the surface with an electron beam, dispersing the consequent emission into a spectrum, evaluating the adhesion between the forsterite film and the surface of the steel sheet using at least one of the intensity of emission peak A and/or emission peak B observed at 380 to 600 nm wavelengths, and the intensity ratio described below, and evaluating the amount of forsterite in the forsterite film using the intensity of emission peak C observed at a wavelength of 600 to 665 nm;

(Intensity Ratio)

the intensity ratio is any of Ia/Ic, Ib/Ic, and (Ia+Ib)/Ic, wherein Ia is the intensity of emission peak A, Ib is the intensity of emission peak B observed at a longer wavelength than the emission peak A, and Ic is the intensity of emission peak C.

[13] The method for manufacturing grain oriented electrical steel sheets described in Claim [11] or [12], wherein the evaluation in the screening step uses the intensity of emission peak A observed at 380 to 450 nm and/or Ia/Ic.

[14] A grain oriented electrical steel sheet having a forsterite film on a steel sheet, the grain oriented electrical steel sheet having an intensity ratio Ia/Ic of not less than 0.4 in a spectrum of light emitted from the grain oriented electrical steel sheet upon irradiation of an electron beam onto the surface, wherein Ia is the peak intensity of emission peak A observed at a wavelength of 380 to 450 nm and Ic is the intensity of emission peak C observed at a wavelength of 600 to 665 nm, and the amount of oxygen in the forsterite film being not less than 2.6 g/m$^2$.

[15] The grain oriented electrical steel sheet described in [14], which has undergone magnetic domain refining treatment.

[16] An iron core including layers of the grain oriented electrical steel sheet described in [14] or [15].

Advantageous Effects

The grain oriented electrical steel sheets according to the disclosed embodiments have a forsterite film exhibiting high adhesion properties with respect to the surface of the steel sheet. In the grain oriented electrical steel sheets according to the disclosed embodiments, the forsterite film maintains high adhesion with respect to the surface of the steel sheet even when processed by magnetic domain refining treatment.

Further, the disclosed embodiments can evaluate whether grain oriented electrical steel sheets have a high-performance forsterite film (a forsterite film exhibiting high adhesion with respect to the surface of the steel sheet), and can manufacture or provide such grain oriented electrical steel sheets.

DETAILED DESCRIPTION

Hereinbelow, embodiments of the disclosed embodiments will be described. The disclosure is not limited to those embodiments described below.

<First Embodiment>

The following describes the first embodiment. Grain oriented electrical steel sheets in the disclosed embodiments have a forsterite film on a steel sheet, and preferably have a tension coating, a forsterite film and a steel sheet in this order from the surface side.

Any known grain oriented electrical steel sheets may be suitably used as the steel sheets without limitation as to, for example, whether or not the steel sheets contain inhibitor components. For the sake of convenience, the specification uses the term "grain oriented electrical steel sheet" to indicate a grain oriented electrical steel sheet having a forsterite film on a steel sheet or a grain oriented electrical steel sheet having a tension coating and a forsterite film on a steel sheet, and the term "steel sheet" to refer to a grain oriented electrical steel sheet before the formation of a tension coating and a forsterite film.

For example, a forsterite film may be formed on a steel sheet by the following method. First, a steel sheet finished to a final sheet thickness and containing an appropriate amount of Si is subjected to decarburization annealing which also serves as recrystallization annealing. Next, an annealing separator (suitably one based on MgO) is applied, and final finishing annealing is performed in order to effect secondary recrystallization and to form a forsterite film.

During the decarburization annealing, an oxide film based on $SiO_2$ (subscales) is formed on the surface of the steel sheet. This oxide film is reacted with MgO in the annealing separator during the final finishing annealing, thus forming a forsterite film ($Mg_2SiO_4$) on the steel sheet.

A tension coating may be formed by a known method. For example, a tension coating may be formed on the forsterite film after the final finishing annealing, by an inorganic coating process or a ceramic coating process such as physical vapor deposition or chemical vapor deposition. The formation of a tension coating layer makes it possible to reduce the iron loss.

Next, a preferred embodiment of the grain oriented electrical steel sheets of the disclosed embodiments will be described. The total area percentage of regions in which a forsterite film is missing (defective parts) as viewed from above the surface (the percentage is sometimes written simply as the "area percentage") is less than 1.5%. Hereinbelow, there will be described how to determine the area percentage of defective parts.

First, a forsterite evaluation apparatus necessary for the above determination will be described.

Figure 1:
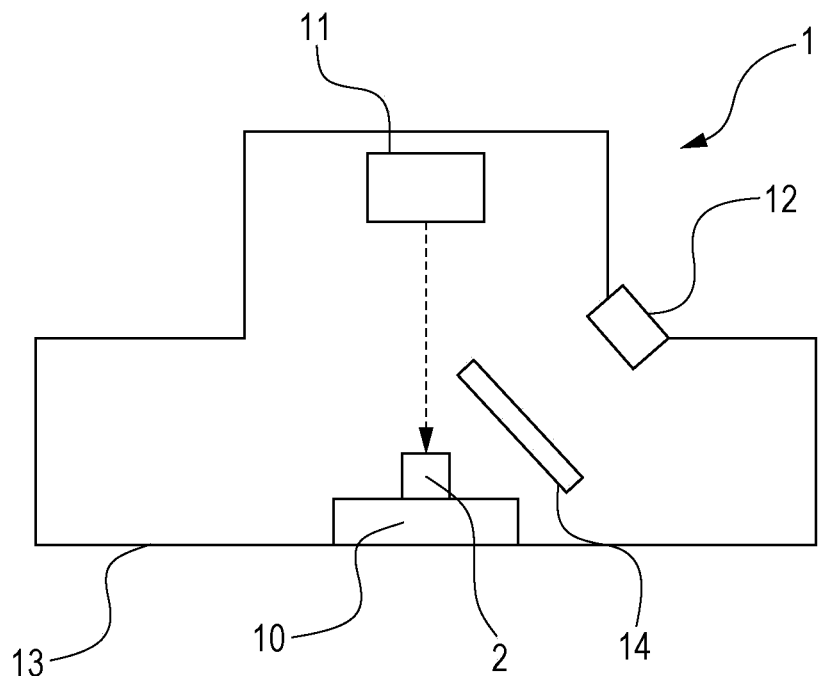
FIG. 1 is a view explaining a first embodiment, and schematically illustrates an example of forsterite evaluation apparatuses.
Figure 2:
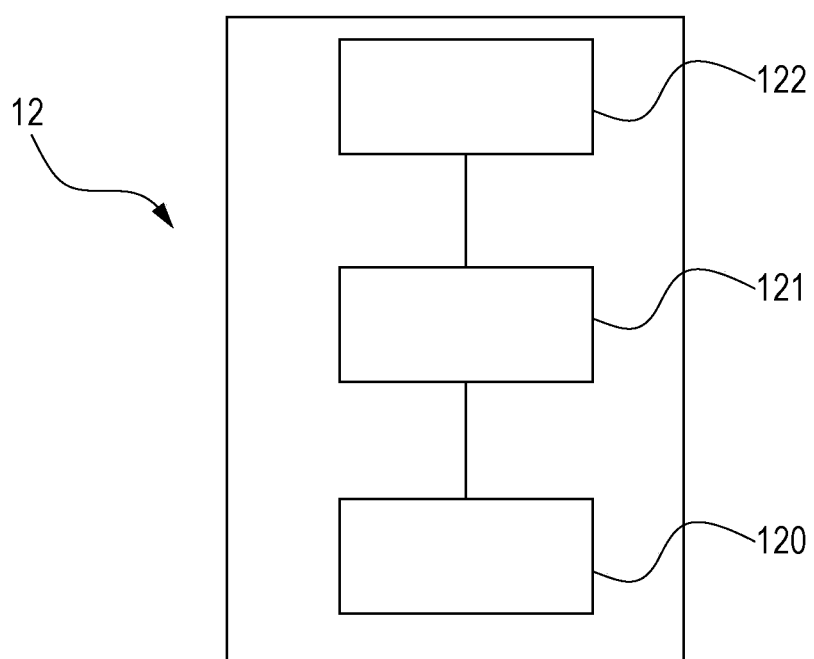
FIG. 2 is a view explaining the first embodiment, and schematically illustrates an optical evaluation unit in the forsterite evaluation apparatus shown in FIG. 1.

FIG. 1 is a view schematically illustrating an example of the forsterite evaluation apparatuses. FIG. 2 is a view schematically illustrating an optical evaluation unit in the forsterite evaluation apparatus shown in FIG. 1. As illustrated in FIG. 1, a forsterite evaluation apparatus 1 includes a sample table 10, an electron beam irradiation unit 11, an optical evaluation unit 12, a vacuum chamber 13 and a wavelength cut filter 14. As illustrated in FIG. 1, the sample table 10, the electron beam irradiation unit 11, the optical evaluation unit 12 and the wavelength cut filter 14 are accommodated in the vacuum chamber 13. Here, the degree of vacuum that can be realized by the vacuum chamber is such that SEM is operable, and is usually $10^{-2}$ Pa. This, however, does not necessarily apply to a system having differential evacuation, and the degree of vacuum is tolerable up to, for example, about 200 Pa.

The forsterite evaluation apparatus 1 illustrated in FIG. 1 has the wavelength cut filter 14. However, the desired information such as the presence or absence of forsterite can be obtained based on optical information even without the wavelength cut filter 14. Thus, the wavelength cut filter 14 may be omitted.

In the forsterite evaluation apparatus 1, a sample 2 (a sample of a grain oriented electrical steel sheet) held on the sample table 10 can be irradiated with an electron beam irradiated by the electron beam irradiation unit 11 (for example, an electron beam generator and an electronic optical system that focuses the electron beam and performs scanning) (in FIG. 1, the electron beam is shown by a dotted arrow). When the sample 2 irradiated with the electron beam has forsterite, the sample 2 emits light by being excited by the electron beam. The optical evaluation unit 12 evaluates this light to localize luminescent regions and non-luminescent regions, and thereby determines the presence of forsterite, the location of forsterite, the amount of forsterite, and the distribution of the amount of forsterite.

As illustrated in FIG. 2, the optical evaluation unit 12 has an optical measurement section 120, a quantitative analysis section 121 and a correlation storage section 122. The optical evaluation unit 12 is a combination of a general optical detector (corresponding to the optical measurement section 120) that detects light and determines the signal intensity and brightness of the light, with the correlation storage section 122 that stores specific correlations and the quantitative analysis section 121 that applies information from the optical detector to the correlations and quantitatively analyzes the light. While the optical measurement section 120, the quantitative analysis section 121 and the correlation storage section 122 are illustrated as being connected together via signal cables or the like, such an arrangement in one place is not always necessary. For example, the optical measurement section 120 alone may be arranged in the apparatus, and the quantitative analysis section 121 and the correlation storage section 122 may be disposed in an external computer. Thus, a combination of a general optical detector with, for example, a computer that stores the correlations and has a usual quantitative analysis function can constitute an optical evaluation unit 12 that is suitably used in the disclosed embodiments.

The optical measurement section 120 is not particularly limited as long as it can detect visible light, and may be one that detects light by the use of a photomultiplier tube (PMT) or the like. The optical measurement section 120 has a function to convert the information of detected light into information such as signal intensity and brightness. When the sample 2 is irradiated with an electron beam from the electron beam irradiation unit 11, this section detects light emitted from the sample being excited by the electron beam and converts the information of the light into information such as signal intensity and brightness.

The optical measurement section 120 can detect light emitted from the sample being excited by the electron beam, in such a manner that the surface of the sample is divided into a plurality of segments and the emission of light is examined with respect to each of the segments. Thus, the area of emission regions and that of non-emission regions can be estimated based on the detection of light by the optical measurement section 120. The area of the segment (the area per segment) is not particularly limited and may be adjusted appropriately in accordance with factors such as the required accuracy of the estimation.

The information of light detected by the optical measurement section 120 may be viewed by, although not particularly limited to, using the optical evaluation unit 12 in combination with SEM. For example, the optical measurement section 120 may be fitted to SEM and the signals may be visualized by making the locations of electron beam scanning correspond to the signals.

As mentioned earlier, the optical measurement section 120 can measure the signal intensity or brightness of light. This signal intensity or brightness is transmitted to the quantitative analysis section 121. In the quantitative analysis section 121, the amount of forsterite in the sample and the distribution of the amount of forsterite are derived based on this information of light and the correlations stored in the correlation storage section 122 (the correlations between the signal intensity or brightness of light emitted from a forsterite-containing sample being excited by an electron beam and the amount of forsterite). More specifically, the signal intensity or brightness is compared with the correlations to derive the amount of forsterite in a certain domain, and the distribution of the amount of forsterite is derived from the information regarding the amounts of forsterite in the plurality of domains. The quantitative analysis section 121 judges that forsterite is present when the signal intensity or brightness is not less than a prescribed threshold, and that forsterite is absent when the threshold is not reached; and calculates the area percentage of defective parts based on the binarized distribution. The term "brightness" indicates the brightness in a CL image derived based on the signal intensity of the electron-beam-excitation light and may be expressed in terms of, for example, luminance. The threshold may be set appropriately in accordance with factors such as the brightness in a CL image.

The correlations to be stored in the correlation storage section 122 may be established by any method without limitation. For example, the correlations may be established by applying an electron beam to each of samples which contain forsterite in a known amount and are different from one another in the amount of forsterite, and measuring the signal intensity or brightness of the consequent electron-beam-excitation light.

Figure 3A:
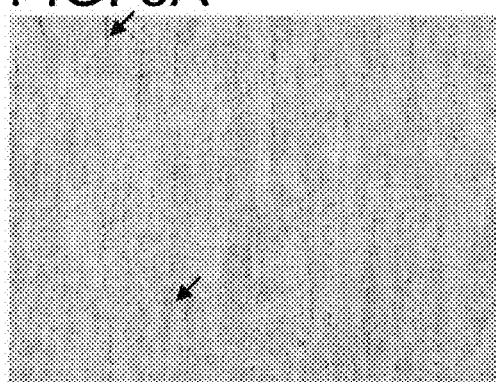
FIG. 3A and FIG. 3B are views explaining the first embodiment, and show one example of results obtained by studying the distribution of a forsterite film.
Figure 3B:
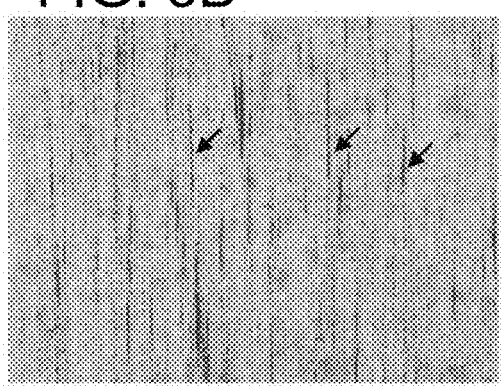

With the forsterite evaluation apparatus described above, the present inventors analyzed grain oriented electrical steel sheets having excellent film adhesion (the adhesion properties between the steel sheet surface and a forsterite layer) and grain oriented electrical steel sheets having poor film adhesion by observing a formation condition of the forsterite film in a non-destructive manner from above a tension coating in order to examine how the formation condition of the forsterite film was different among the grain oriented electrical steel sheets. One example of results studied for the distributions of the forsterite film is illustrated in FIG. 3A and FIG. 3B. The magnification of the CL images shown in FIG. 3A and FIG. 3B is 50 times relative to Polaroid (registered trademark) photographs, and the size of the regions shown is about 1.7 mm×2.1 mm. In the CL images shown in FIG. 3A and FIG. 3B, regions free from the forsterite film are dark because basically no signal of excitation light is obtained in such regions. Some of such dark regions are indicated by arrows in the CL images in FIG. 3A and FIG. 3B. Hereinbelow, these regions are written as defective parts on the forsterite film (or simply defective parts).

The CL image in FIG. 3A shows a grain oriented electrical steel sheet that has excellent film adhesion, and the CL image in FIG. 3B illustrates a grain oriented electrical steel sheet that has poor film adhesion. The comparison of the two images shows that the proportion of the area of defective parts relative to the surface of the forsterite film is lower in the CL image of the grain oriented electrical steel sheet having excellent film adhesion. The defective parts are about 20 µm or less in width. While the defective parts in most cases are distributed as streaks having a length in one direction of 50 µm or more, some form a series of dots.

As mentioned above, some defective parts are dots. The diameter of the dots is 5 µm to 50 µm. As illustrated in FIG. 3A and FIG. 3B, such dots are scattered. The defective parts of interest do not include film defects having a visually recognizable size, for example, circular, elliptical or similar amorphous defects having an equivalent circular diameter of greater than 200 µm and found at low frequency (for example, as low a frequency as less than one defect in a 10 mm×10 mm field of view (less than 50% chance for one defect to be found in the above field of view)). Thus, such defects are excluded from the film defects to be evaluated in the disclosed embodiments.

Figure 4A:
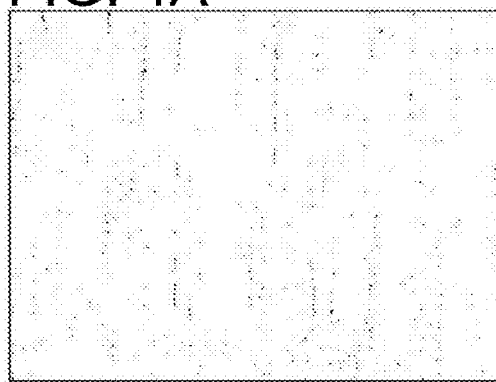
FIG. 4A and FIG. 4B are views explaining the first embodiment, and show binary images obtained by binarizing the CL images shown in FIG. 3A and FIG. 3B so as to distinguish defective parts from intact parts in which a forsterite film is present, based on an appropriate threshold.
Figure 4B:
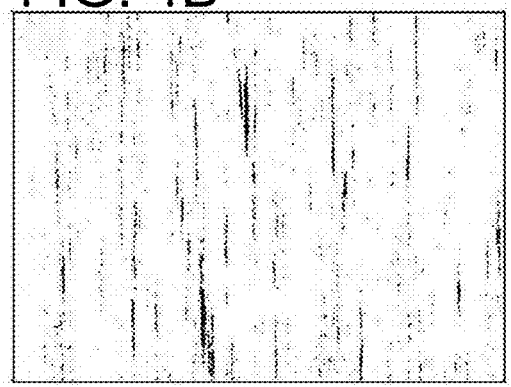

FIG. 4A and FIG. 4B show binary images obtained by binarizing the CL images shown in FIG. 3A and FIG. 3B so as to distinguish defective parts from intact parts in which a forsterite film is present based on an appropriate threshold. The binary image in FIG. 4A corresponds to the CL image in FIG. 3A, and the binary image in FIG. 4B to the CL image in FIG. 3B. Referring to FIG. 4A and FIG. 4B, the area percentage of defective parts on the film can be quantified by calculating the area percentage of dark parts (defective parts) relative to the total of the area of bright parts (intact parts in which a forsterite film is present) and the area of dark parts. The defective parts are distributed substantially uniformly over the surface of the forsterite film. Thus, the local area percentage calculated as described above may be regarded as representing the area percentage of defective parts over the entire surface of the forsterite film.

The present inventors have performed magnetic domain refining treatment on grain oriented electrical steel sheets having different levels of film adhesion and have studied relationships between the area percentage of defective parts on the forsterite film and the film adhesion. Specifically, the electron beam for the magnetic domain refining treatment was irradiated forcibly on a tension coating to exfoliate the forsterite film with the condition of an intentionally strong and constant emission (16 mA). The film adhesion was evaluated based on the area percentage of consequent defective parts. The film adhesion was evaluated as good when the area percentage of film exfoliation was less than 10%, and as acceptable when the area percentage was 10 to 15%. The area percentage of defective parts on the forsterite film and the area percentage of film exfoliation were determined with respect to binarized images of CL images.

Figure 5:
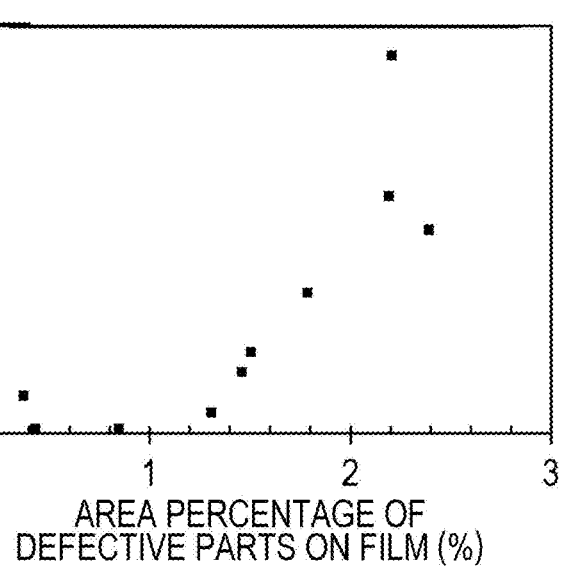
FIG. 5 is a diagram explaining the first embodiment, and illustrates relationships between the area percentage of defective parts before magnetic domain refining treatment by electron beam irradiation, and the area percentage of film exfoliation after magnetic domain refining treatment by electron beam irradiation.

FIG. 5 illustrates the relationships between the area percentage of defective parts before the magnetic domain refining treatment by electron beam (on the abscissa, AREA PERCENTAGE OF DEFECTIVE PARTS ON FILM), and the area percentage of film exfoliation after the magnetic domain refining treatment by electron beam (on the ordinate, AREA PERCENTAGE OF EXFOLIATION BY ELECTRON BEAM IRRADIATION). According to the relationships, it has been found that when the area percentage of defective parts before the treatment was 1.5% or above, the area percentage of film exfoliation after the treatment was above 15% and thus adhesion properties were deteriorated. Further, from FIG. 5, it has been found that the adhesion properties were slightly decreased also when the area percentage of defective parts on the forsterite film was less than 0.1%.

The fact that high film adhesion was obtained even when processed by the above electron beam treatment shows that extremely high film adhesion is attained when the area percentage of defective parts is less than 1.5%. Further, for the reason described above, the area percentage of defective parts is preferably not less than 0.1%.

Defective parts are scattered on the surface of a forsterite film, and at least some of the defective parts are in the form of streaks. Such defective streaks are elongated defects in some cases, and are also continuous defective dots which form streaks as a whole. These defective parts can be identified in CL images. The present inventors studied the mode in which a forsterite film was distributed before and after the beam irradiation for a magnetic domain refining. As a result, they have found that streaky defective parts (including continuous dots forming streaks as a whole) can serve as starting points of film exfoliation. Thus, although the presence of at least a specific proportion of defective parts such as streaks is preferable as will be described below, the area percentage of such defective parts is to be controlled to less than 1.5% and thereby a practically sufficient level of adhesion properties can be ensured.

As described above, the film adhesion is more resistant to damage by the beam irradiation for a magnetic domain refining when defective parts such as streaks are present with an area percentage of 0.1% to less than 1.5%, than when defects such as streaks are completely absent. This fact is ascribed to the assumption that the defective parts such as streaks are capable of preventing the propagation of film exfoliation and that an appropriate distribution of defective parts on the film makes the film flexible to external force. Further, industrial advantages are obtained by defective parts being allowed to be present in an appropriate amount. That is, no means are required such as, for example, the formation of a very large amount of oxide to attain complete coverage of the steel sheet surface with forsterite.

For example, the defective parts may be formed by a method described in examples. The streaky defective parts are preferably and easily formed by extending the defective parts in the direction of the rolling of the grain oriented electrical steel sheet.

As described above, the area percentage of defective parts on a forsterite film may be estimated by obtaining a CL image, namely, in a non-destructive manner without separating a tension coating. The film adhesion of final products may be evaluated beforehand based on whether or not the area percentage of defective parts falls in the aforementioned range.

The method for evaluating forsterite films discussed above may be implemented with the forsterite evaluation apparatus described hereinabove. As already mentioned, for example, the apparatus may be such that a detector capable of detecting light (corresponding to the optical measurement section 120) is fitted to SEM and the signals are visualized by making the locations of electron beam scanning correspond to the signal. Desirably, the image is retrievable as digital signals. The detector is not particularly limited as long as it can detect visible light, and may be one that detects light by the use of a photomultiplier tube (PMT) or the like.

For the evaluation of a forsterite film lying under a tension coating, it is necessary to adjust an accelerating voltage as the conditions under which an excitation electron beam is irradiated. Because the magnitude of the accelerating voltage that is required varies depending on the type or thickness of the tension coating, an appropriate accelerating voltage that allows for an observation of the distribution of the forsterite film with least influence of the surface profile may be selected by comparing a CL image and a usual secondary electron image. This selection can be made by comparing CL images with secondary electron images captured at various magnitudes of the accelerating voltage without undue trial and error. As an example, the accelerating voltage is suitably in the range of 20 to 40 kV in the case of a 1 to 2 μm thick phosphate based tension coating. While the magnification of images may be determined appropriately, a low magnification is desirable in order to allow a film distribution to be observed in a wider field of view. For example, the magnification of the images in FIG. 3A and FIG. 3B is 50 times relative to Polaroid (registered trademark) photographs, and the size of the regions shown is about 1.7 mm×2.1 mm. To estimate the area percentage of defective parts on a forsterite film, three or more fields of view may be photographed with this magnification and the CL images may be binarized and averaged. The threshold in the binarization depends on the brightness or contrast with which the CL images are obtained. The threshold may be selected under such conditions that, as illustrated in FIG. 4A and FIG. 4B, defective parts such as streaks on the film can be extracted while viewing the image and as few dark dots as possible are made visible.

Next, a method for manufacturing the grain oriented electrical steel sheets of the disclosed embodiments will be described.

In the manufacturing of a grain oriented electrical steel sheet, a slab that has been heated is hot rolled and is cold rolled one time or two times with intermediate annealing to attain a final sheet thickness. The steel sheet is then decarburized annealed. Next, an annealing separator such as MgO is applied to the surface of the steel sheet and a forsterite film is formed by subsequent final finishing annealing, as described above. To form streaky defective parts on the surface of the forsterite film, the cold rolling conditions may be controlled so that the surface of the steel sheet before decarburization annealing will have portions that are convex mainly in the rolling direction. Such convex portions of the steel sheet accept less annealing separator, and consequently the final finishing annealing will leave streaky defective parts on the forsterite film. Alternatively, the annealing separator may be applied with a brush or the like so as to leave streaks in which the annealing separator is missing. In the case where scale defective parts are formed in an excessively large amount and are to be reduced in quantity, the decarburization annealing conditions may be changed appropriately. Specifically, for example, excessive formation of defects due to a shortage of subscales may be addressed by increasing the oxidizing ability ($P(H_2O)/P\ H_2$)) of the atmosphere during the decarburization annealing to form thick subscales. In this case, too, portions that are not coated with the annealing separator become streaky defective parts on the resultant forsterite film after final finishing annealing. As described above, streaky defective parts on the forsterite film are preferably formed along the longitudinal direction of the coil (the rolling direction) because the treatment can be performed continuously and the manufacturing is simple and efficient. The amount in which the forsterite film is formed is not particularly limited. But it is desirable that the amount of oxygen is not less than 2.4 g/m$^2$, when the amount of forsterite is estimated based on the amount of oxygen in the film. If the amount of the film (the amount of forsterite) is less than this, sufficient film adhesion may not be obtained at times even when the percentage of the defective parts on the forsterite film is in the range of the disclosed embodiments.

Magnetic domain refining treatment may be performed on the grain oriented electrical steel sheet of the disclosed embodiments by any method without limitation. When the treatment is performed by the irradiation of an electron beam (not the electron beam used to capture the CL images), magnetic domains of the steel sheet can be refined with little exfoliation of the forsterite film and thus corrosion resistance can be ensured without additional coating (recoating) of defective parts. Thus, grain oriented electrical steel sheets which provide low iron loss and are resistant to corrosion can be obtained at low costs. Here, an electron beam for magnetic domain refining is preferably irradiated under the following conditions, in which E is the accelerating voltage (kV), I the beam current (mA) and V the beam scanning velocity (m/s):

$40 \leq E \leq 150$ $6 \leq I \leq 12$ $V \leq 40$

The diameter of the electron beam is preferably not more than 0.4 mm. The irradiation may take place one or more times. While any such conditions described above may be adopted without limitation as long as film exfoliation is not caused, the grain oriented electrical steel sheets of the disclosed embodiments are more resistant to film exfoliation under higher current irradiation conditions. The term "higher current conditions" means a current of 8 mA or above. The upper limit is not particularly limited and may be set appropriately while still ensuring that the forsterite film will not be exfoliated.

As discussed above, the grain oriented electrical steel sheet of the disclosed embodiments achieves high adhesion of the forsterite film by virtue of the total area percentage of defective parts scattered on the forsterite film as viewed from above the surface being less than 1.5% relative to the surface area of the forsterite layer.

One of the characteristics of the grain oriented electrical steel sheet of the disclosed embodiments is that high film adhesion can be ensured even when processed by electron beam treatment.

With the disclosed embodiments being applied to a production line, it becomes possible to manufacture a grain oriented electrical steel sheet while ensuring film properties over the entire length of the coil by adjusting the manufacturing conditions in light of feedbacks of the results obtained.

The grain oriented electrical steel sheets of the disclosed embodiments have excellent film adhesion as discussed above. Therefore, quality iron cores are manufactured by using the steel sheets. The iron cores intended in the disclosed embodiments are iron cores for motors, with examples including wound iron cores and stacked iron cores.

Further, the efficient manufacturing of quality grain oriented electrical steel sheets becomes feasible by introducing a screening step in which grain oriented electrical steel sheets are screened based on the total area percentage of defective parts scattered on a forsterite film as viewed from above the surface, or further a magnetic domain refining step in which magnetic domain refining treatment is performed on those steel sheets screened as acceptable. Those steel sheets rejected by the screening may be used in applications which require a lower level of characteristics.

<Second Embodiment>

The following describes the second embodiment.

First, a grain oriented electrical steel sheet will be described. This grain oriented electrical steel sheet has a tension coating, a forsterite film and a steel sheet in this order from the surface side. Any known grain oriented electrical steel sheets may be suitably used as the steel sheets without limitation as to, for example, whether or not the steel sheets contain inhibitor components. For the sake of convenience, the specification uses the term "grain oriented electrical steel sheet" to indicate a grain oriented electrical steel sheet having a forsterite film or a grain oriented electrical steel sheet having a tension coating and a forsterite film, and the term "steel sheet" to refer to a grain oriented electrical steel sheet before the formation of a tension coating and a forsterite film.

A forsterite film and a tension coating may be formed by any methods without limitation. Example methods will be described below.

An example method for forming a forsterite film on a steel sheet will be described. First, a steel sheet finished to a final sheet thickness and containing an appropriate amount of Si is subjected to decarburization annealing which also serves as recrystallization annealing. Next, an annealing separator (suitably one based on MgO) is applied, and final finishing annealing is performed in order to effect secondary recrystallization and to form a forsterite film.

During the decarburization annealing, an oxide film based on $SiO_2$ (subscales) is formed on the surface of the steel sheet. This oxide film is reacted with MgO in the annealing separator during the final finishing annealing, thus forming a forsterite film ($Mg_2SiO_4$) on the steel sheet.

A tension coating may be formed by a known method. For example, a tension coating may be formed on the forsterite film after the final finishing annealing, by an inorganic coating process or a ceramic coating process such as physical vapor deposition or chemical vapor deposition. The formation of a tension coating layer makes it possible to reduce the iron loss.

Next, a method for evaluating the adhesion properties between a forsterite film and the steel sheet surface will be described.

Figure 6:
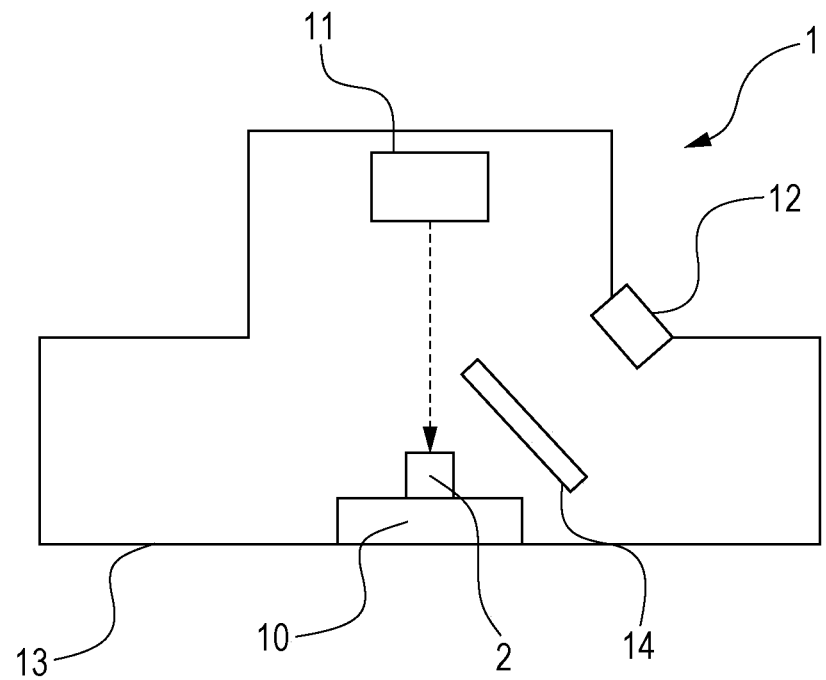
FIG. 6 is a view schematically illustrating an example of forsterite evaluation apparatuses.
Figure 7:
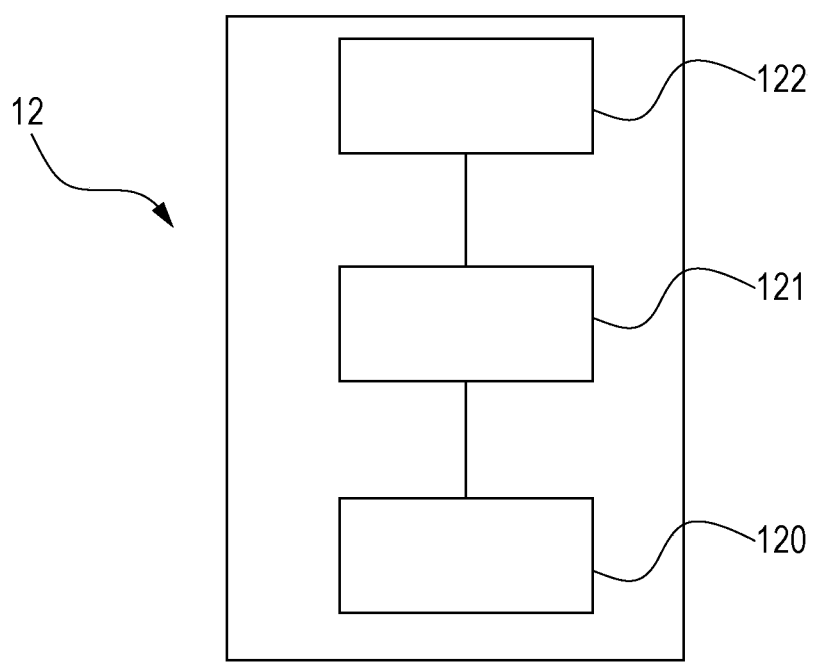
FIG. 7 is a view schematically illustrating an optical evaluation unit in the forsterite evaluation apparatus shown in FIG. 6.

FIG. 6 is a view schematically illustrating an example of forsterite evaluation apparatuses. FIG. 7 is a view schematically illustrating an optical evaluation unit in the forsterite evaluation apparatus shown in FIG. 6. As illustrated in FIG. 6, a forsterite evaluation apparatus 1 includes a sample table 10, an electron beam irradiation unit 11, an optical evaluation unit 12, a vacuum chamber 13 and a wavelength cut filter 14. As illustrated in FIG. 6, the sample table 10, the electron beam irradiation unit 11, the optical evaluation unit 12 and the wavelength cut filter 14 are accommodated in the vacuum chamber 13. Here, the degree of vacuum that can be realized by the vacuum chamber 13 is such that SEM is operable, and is usually $10^{-2}$ Pa. This, however, does not necessarily apply to a differential evacuation system, and the degree of vacuum is tolerable up to, for example, about 200 Pa.

The forsterite evaluation apparatus 1 illustrated in FIG. 6 has the wavelength cut filter 14. However, the properties of a forsterite film can be analyzed based on optical information even without the wavelength cut filter 14. Thus, the wavelength cut filter 14 may be omitted.

In the forsterite evaluation apparatus 1, a sample 2 (a sample of a grain oriented electrical steel sheet) held on the sample table 10 can be irradiated with an electron beam irradiated by the electron beam irradiation unit 11 (for example, an electron beam generator and an electronic optical system that focuses the electron beam and performs scanning) (the electron beam is illustrated by a dotted arrow). When the sample 2 irradiated with the electron beam has forsterite, the sample 2 emits light by being excited by the electron beam. The optical evaluation unit 12 evaluates this light to estimate the properties of the forsterite film such as film adhesion, the amount of forsterite, magnetic characteristics, strain, and impurities. The film adhesion may be estimated using at least one of the intensity of emission peak A and/or emission peak B observed at 380 to 600 nm wavelengths (see FIG. 8), and the intensity ratio described later. The amount of forsterite may be estimated based on the intensity of emission peak C observed at a wavelength of 600 to 665 nm (see FIG. 8). The magnetic characteristics may be estimated based on the intensity of emission peak A and/or emission peak B. The presence of impurities may be identified based on the intensities of emission peaks A to D (see FIG. 8).

As illustrated in FIG. 7, the optical evaluation unit 12 has an optical measurement section 120, a quantitative analysis section 121 and a correlation storage section 122. The optical evaluation unit 12 is a combination of a general optical detector (corresponding to the optical measurement section 120) which has a function capable of measuring a CL spectrum (a description as to how the detector measures a CL spectrum will be given later) and which detects light and determines the signal intensity and brightness of specific wavelengths of light in the CL spectrum, with the correlation storage section 122 that stores specific correlations and the quantitative analysis section 121 that makes information from the optical detector correspond to the correlations and quantitatively analyzes the light. Thus, a combination of a general optical detector with, for example, a computer that stores the correlations and has a usual quantitative analysis function can constitute an optical evaluation unit 12 that is suitably used in the disclosed embodiments.

The optical measurement section 120 is not particularly limited as long as it can detect visible light, and may be one that detects light by the use of a photomultiplier tube (PMT) or the like. The optical measurement section 120 has a function to convert the information of detected light into information such as signal intensity and brightness. When the sample 2 is irradiated with an electron beam from the electron beam irradiation unit 11, this section detects light emitted from the sample being excited by the electron beam and converts the information of specific wavelengths of light in the CL spectrum into information such as signal intensity and brightness.

The optical measurement section 120 can detect light emitted from the sample being excited by the electron beam, in such a manner that the surface of the sample is regarded as a single region or in such a manner that the surface of the sample is divided into segments and the emission of light is detected with respect to each of the segments. The segment-wise detection makes it possible to evaluate the properties of the forsterite film with respect to the individual segments. The area of the segment is not particularly limited and may be adjusted appropriately in accordance with factors such as the required accuracy of the estimation.

The information of light detected by the optical measurement section 120 may be viewed by, although not particularly limited to, using the optical evaluation unit 12 in combination with SEM. For example, the optical measurement section 120 may be fitted to SEM and the signals may be visualized by making the locations of electron beam scanning correspond to the signal.

As mentioned earlier, the optical measurement section 120 can measure the signal intensity or brightness of specific wavelengths of light in the CL spectrum. This signal intensity or brightness is transmitted to the quantitative analysis section 121. In the quantitative analysis section 121, the film adhesion and the amount of forsterite are derived based on this information of light and the correlations stored in the correlation storage section 122 (the correlations include correlations between the intensity or intensity ratio of specific emission peaks and the film adhesion, correlations between the intensity or intensity ratio of specific emission peaks and the amount of forsterite, and correlations between the intensity or intensity ratio of specific emission peaks and the magnetic characteristics). The term "brightness" indicates the brightness in a CL image derived based on the signal intensity of the electron-beam-excitation light and may be expressed by using, for example, the term "luminance".

The correlations to be stored in the correlation storage section 122 may be established by any methods without limitation. For example, the correlations may be established by using a plurality of samples which have a known amount of forsterite and a known strength of film adhesion and which are different from one another in the amount of forsterite and in the strength of film adhesion, irradiating each of the samples with an electron beam, and measuring the signal intensity or brightness of the consequent specific emission peaks.

The disclosed embodiments are characterized in that it uses correlations between specific emission peaks and the properties of a forsterite film. Examples of the "correlations between specific emission peaks and the properties of a forsterite film" include correlations between specific emission peaks and film adhesion, correlations between a specific emission peak and the amount of forsterite, and correlations between specific emission peaks and magnetic characteristics. These correlations will be described in detail below.

Figure 8:
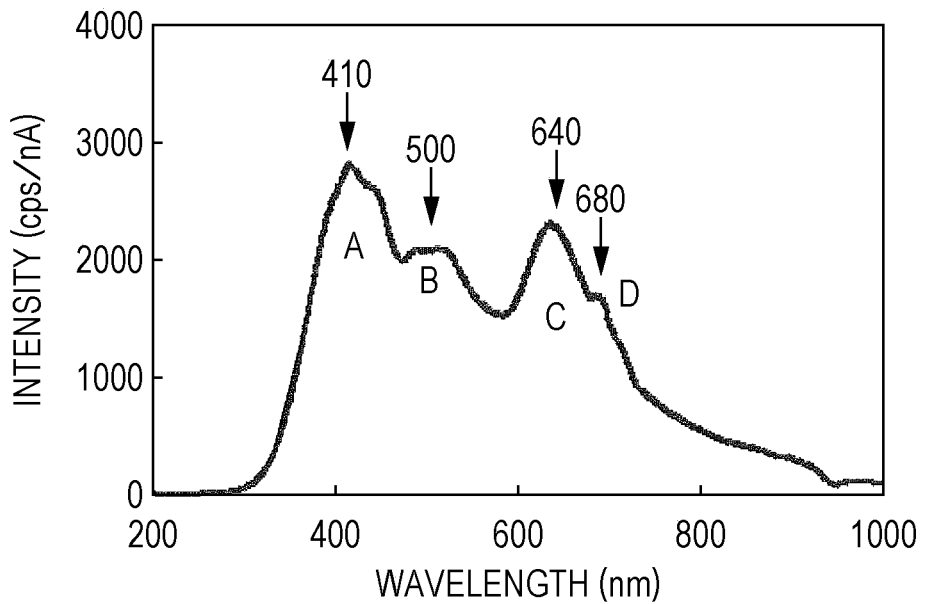
FIG. 8 is an example CL spectrum of a grain oriented electrical steel sheet having a tension coating, a forsterite film and a steel sheet in this order from the surface side.

FIG. 8 is an example CL spectrum of a grain oriented electrical steel sheet having a tension coating, a forsterite film and a steel sheet in this order from the surface side. The CL spectrum includes 380-450 nm emissions centered at a wavelength of about 410 nm (written as the emission peak A), 450-600 nm emissions observed at a wavelength of about 500 nm (written as the emission peak B), and 600-665 nm emissions centered at a wavelength of about 640 nm (written as the emission peak C). Further, emissions at about 680 nm wavelength (written as the emission peak D) are also observed.

Figure 9:
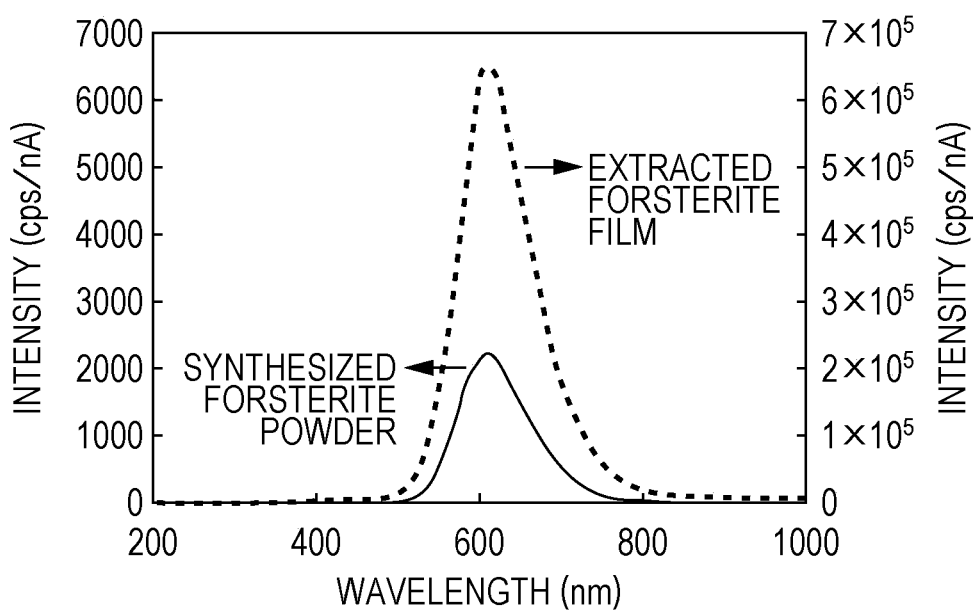
FIG. 9 is an example emission spectrum of a forsterite powder synthesized from reagents, measured under the same conditions as FIG. 8.

A forsterite powder was synthesized from reagents and was analyzed under the same conditions as FIG. 8, the emission spectrum being shown in FIG. 9 (written as SYNTHESIZED FORSTERITE). Emissions having a peak wavelength of about 615 nm are highest (the emissions are assumed to be the emission peak C in light of the above description). The emission peak C of the synthesized forsterite is off the location of the emission peak C of the forsterite film shown in FIG. 8. The reason for this mismatch will be described later. Further, a grain oriented electrical steel sheet having a tension coating, a forsterite film and a steel sheet in this order from the surface side was treated to dissolve the tension coating and the steel sheet, and a powder of the thus-extracted forsterite film was analyzed. A CL spectrum of the powder (written as EXTRACTED FORSTERITE FILM) is also illustrated in FIG. 9. Similarly, the emission peak C is the single and highest peak.

When the intensity axis is enlarged, the CL spectrum of the synthesized forsterite has a very weak emission peak A at the same position as that in the CL spectrum of the grain oriented electrical steel sheet. Forsterite samples synthesized using various oxides such as $Al_2O_3$ and CaO were analyzed to measure their CL spectra. While the intensity of the peak A was slightly increased depending on the type of the oxide added, the peak C was the main peak in all the spectra and the emission peak A or B was faint in contrast to the CL spectrum of the grain oriented electrical steel sheet shown in FIG. 8. In view of the fact that forsterite alone was responsible for the emission of light from the sample in FIG. 8, it can be said that the emission peaks A and B (the emission peak (A+B)) are assigned to emissions which are characteristic of a forsterite film formed on a grain oriented electrical steel sheet.

Figure 10:
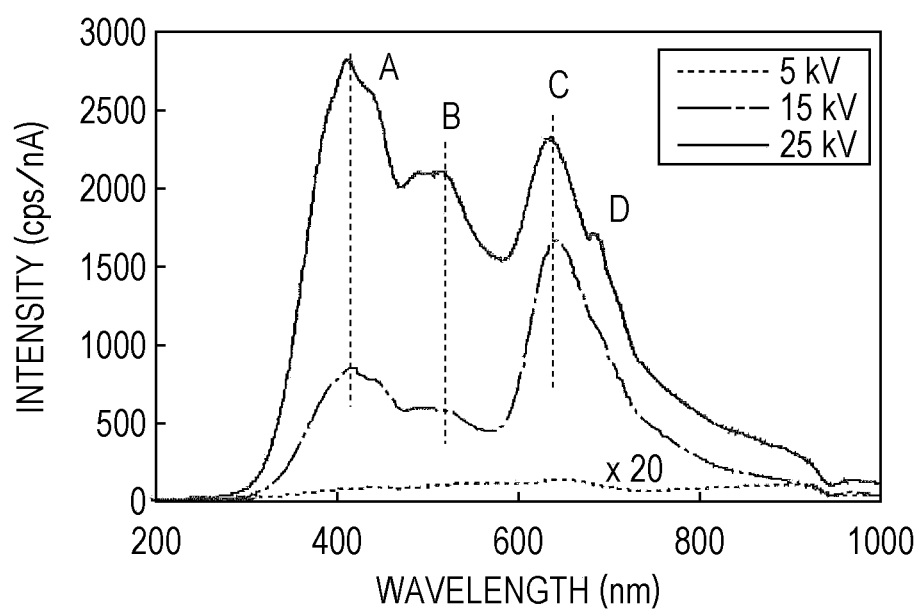
FIG. 10 illustrates CL spectra measured at electron accelerating voltages of 5 kV, 15 kV and 25 kV.

To study how CL spectra of a grain oriented electrical steel sheet having a 2 μm thick tension coating would change in the depth direction, CL spectra were measured while causing electrons to be incident at an accelerating voltage of 5 kV, 15 kV or 25 kV. The results are illustrated in FIG. 10. The intensities of the CL spectra were normalized based on the current of the incident electrons. The intensities of the CL spectra increased with increasing magnitude of the incident electron accelerating voltage, probably because the electrons accelerated at a higher voltage increased an excited number of electron-hole pairs that were responsible for emission. It should be noted that the emission peak A and the emission peak B showed higher intensities relative to that of the emission peak C as the accelerating voltage was increased. This suggests that the emission peak A and the emission peak B are signals from relatively deep locations below the sample surface, namely, from the vicinity of the steel sheet.

Based on the results described above, the assignment of the emission peaks has been studied.

The emission peak A and the emission peak B are assigned to lattice defects in the forsterite crystal and the intensities thereof are slightly increased by the coexistence of solute elements such as Al and Ti. It is probable that their intensities are significantly increased by the forsterite film being strongly bound to the steel sheet, namely, by the increase in the adhesion between the steel sheet surface and the forsterite film. For example, it is considered that the emission intensities is increased by a stress that occurs in the forsterite film by the interface bonding between the film and the steel sheet surface.

The emission peak C is highly observed in all the grain oriented electrical steel sheet, the forsterite film extracted therefrom and the synthesized forsterite, and therefore probably indicates an emission that is inherent to forsterite. The intensity of this emission peak is increased by the presence of Mn but is generally insusceptible to other elements. The wavelength at which this emission peak is observed in the grain oriented electrical steel sheet is slightly longer than that in the extracted forsterite film and that in the synthesized forsterite. Presumably, this shift is a change in the peak position of the emission peak C due to contact with the steel sheet. While the wavelength for the emission peak C was shifted, no clear change was recognized in the emission peak intensity. Further, the emission peak D probably arises from the presence of Al or Cr.

Based on the above discussions, the intensities of the emission peaks A and B will reflect the magnitude of the influence experienced by the forsterite film being bonded to the steel sheet surface. Thus, these intensities can serve as an indicator of the adhesion between the forsterite film and the steel sheet surface. On the other hand, the intensity of the emission peak C is substantially unchanged by the existence form of forsterite and thus can be used as an indicator of the amount of forsterite. Based on these findings, a method has been developed which evaluates the properties of a forsterite film on a grain oriented electrical steel sheet based on the intensities of emission peaks in a CL spectrum and the ratio of such intensities.

Next, the evaluation method will be described in detail. As mentioned above, the following correlations will be established.

(1) The intensity Ia of emission peak A and/or the intensity Ib of peak B serves as an indicator of the adhesion between a forsterite film and the surface of a steel sheet.

(2) The intensity Ic of emission peak C serves as an indicator of the amount of forsterite.

The adhesion between a forsterite film and a steel sheet and the amount of forsterite may be estimated by recording CL spectra under the same measurement conditions or by measuring spectra under different conditions and converting the results as if they were obtained under the same conditions using a predetermined formula. The amount of forsterite may be determined based on the intensity Ic of emission peak C preparing and using a calibration curve between the intensity Ic of emission peak C and a value that is proportional to the amount of forsterite, for example, the amount of oxygen. Because the adhesion properties and the amount of forsterite have impacts on magnetic characteristics, the intensities of emission peaks A, B and C and the intensity ratios described hereinabove allow the tendency of magnetic characteristics to be estimated.

Figure 11:
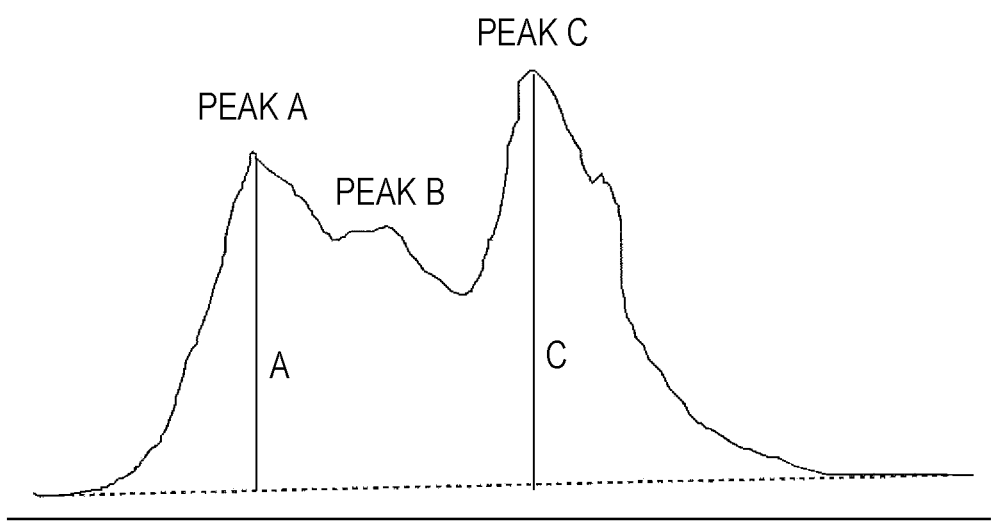
FIG. 11 is an example view illustrating the intensities of emission peaks based on the heights of the peaks.

The intensities of emission peaks may be represented by peak areas or peak heights. An example of the latter case is illustrated in FIG. 11. As will be seen in FIG. 8 and FIG. 11, part of the emission peak B overlaps with the emission peak A and the emission peak C. It is therefore preferable that the indicator of the adhesion between a forsterite film and the surface of a steel sheet be the emission peak A alone which is not much influenced by the other peaks.

The indicator (1) of the adhesion between the surface of a steel sheet and a forsterite film may be the intensity ratio Ia/Ic of the emission peak A to the emission peak C, the intensity ratio Ib/Ic of the emission peak B to the emission peak C, or the intensity ratio (Ia+Ib)/Ic of the emission peaks A and B to the emission peak C. The first advantage in using a plurality of emission peaks is that the use of peak intensities as a ratio can reduce the influence by disturbances such as variations in measurement conditions. The second advantage is that the indicator of film adhesion can show changes more clearly. It is generally known that a forsterite film formed in an excessively large amount tends to be locally exfoliated to produce dot defects. Similarly as described above, the intensity ratio that is used is preferably Ia/Ic because of the insusceptibility of the emission peak A to the other peaks.

Next, conditions in the measurement of CL spectra will be described. Use may be made of an apparatus that is based on an electron beam irradiator, a spectrometer capable of dispersing visible light into a spectrum, and a chamber which accommodates these devices and which can hold vacuum or reduce pressure or can be replaced with light gas (for example, an apparatus illustrated in FIG. 6). An example is a SEM fitted with a spectrometer. The voltage for accelerating incident electrons may be 5 kV to 150 kV. When a SEM is used, the accelerating voltage is more preferably in the range of 10 to 40 kV, and still more preferably in the range of 20 to 30 kV. If the accelerating voltage is below this range, it is difficult to obtain signals from regions near a steel sheet. On the other hand, the use of any higher accelerating voltage in a SEM requires a special design of the apparatus and is also not effective. Other conditions are not particularly limited as long as the obtainable CL spectrum allows for an evaluation based on the aforementioned emission peak intensities.

The forsterite film evaluation method of the disclosed embodiments may be operated at a manufacturing site by providing, on a steel strip delivery route, an apparatus having a chamber which can be brought to vacuum or reduced pressure or can be replaced with light gas, and an electron source and a spectrometer, and inserting a steel sheet as a batch into the chamber or passing a steel strip continuously through the chamber. Film properties may be evaluated online when the chamber is provided downstream of the final finishing annealing step and the steel strip is continuously passed therethrough. The electron beam may be scanned in the width direction, or a plurality of measurement devices having a spectrometer may be arranged in the width direction. In this manner, the steel strip may be evaluated over its length and also over its width. A dedicated measurement system may be provided for the measurement on the manufacturing line. As will be described later, electron beam irradiation may be used when the manufacturing line includes a magnetic domain refining step.

With the disclosed embodiments being applied to a production line, it becomes possible to manufacture a grain oriented electrical steel sheet while ensuring film properties over the entire length of the coil by adjusting the manufacturing conditions in light of the feedbacks of the results obtained.

Based on the evaluation method described above, various grain oriented electrical steel sheets composed of a tension coating, a forsterite film and a steel sheet were analyzed by causing an electron beam to be incident on the sheet at an accelerating voltage of 25 kV and the resultant CL spectra were compared with the adhesion properties of the film. The results have shown that grain oriented electrical steel sheets having good film adhesion can be obtained when the intensity ratio Ia/Ic of the intensity (height) Ia of emission peak A to the intensity (height) Ic of emission peak C is 0.4 or above and the amount of oxygen in the forsterite film is 2.6 g/m$^3$ or above.

It is known that magnetic domain refining treatment on a grain oriented electrical steel sheet reduces the iron loss, and this technique has been in practical use. When the grain oriented electrical steel sheet of the disclosed embodiments having high film adhesion is, for example, irradiated with an electron beam, magnetic domains can be refined without damages such as film exfoliation. Consequently, the grain oriented electrical steel sheet attains high magnetic characteristics and high corrosion resistance without the need of recoating after the magnetic domain refining treatment.

When, as described earlier, magnetic domain refining treatment is performed by the electron beam irradiation, the properties of a forsterite film may be evaluated online in a non-destructive manner by measuring a spectrum of light emitted by the electron beam irradiation.

As discussed above, the disclosed embodiments make it possible to obtain grain oriented electrical steel sheets having excellent properties such as film adhesion. Such grain oriented electrical steel sheets can give quality iron cores. The iron cores intended in the disclosed embodiments are iron cores used in, among others, motors and transformers, with examples including wound iron cores and stacked iron cores.

Further, the efficient manufacturing of quality grain oriented electrical steel sheets becomes feasible by introducing a screening step in which grain oriented electrical steel sheets are screened based on the above emission peaks, or further a magnetic domain refining step. Those steel sheets rejected by the screening may be used in applications which require a lower level of characteristics.

EXAMPLES

Example 1

EXAMPLE 1 corresponds to the first embodiment.

Cold-rolled steel sheets having a sheet thickness of 0.27 mm and a Si content of 3 mass % were subjected to decarburization annealing which also served as recrystallization annealing. Next, an annealing separator based on MgO was applied onto the surface with use of a coater, and the steel sheet was coiled into a coil. Final finishing annealing was performed for the coil to form a forsterite film. Next, a phosphate based tension coating was applied with a thickness of approximately 2 μm, and the steel sheet was annealed. To ensure that streaky defective parts would be formed on the film in a controlled manner, the shape after the finish cold rolling was flat and a fiber having a diameter of 50 μm was wrapped around a portion of the coater roll before the application of the annealing separator thereto. The number of streaky defective parts was changed by changing the number of the fibers, and thereby the area percentage of the defective parts was changed.

CL images of the grain oriented electrical steel sheets thus obtained were observed to determine the area percentage of streaky defective parts (here, all the defective parts were deemed as being streaks). The CL images of the grain oriented electrical steel sheets were obtained under the same condition of using an optical detector composed of an optical guide and a PMT and scanning three rectangular fields of view, each 2.3 mm×1.7 mm of the steel sheets, with an excitation electron beam at an accelerating voltage of 30 kV. Each of the films was found to have defective parts extending along the direction in which the coater (the steel sheet) had traveled. The CL images obtained were each analyzed with an existing image processing software (Photoshop CS6) to evaluate the average luminance with a 256-level gradation. The images were binarized so that the streaky defective parts would be extracted, and the total area percentage of the defective parts was determined. The data of the three fields of view of each sample was averaged.

The indicator of adhesion properties of each sample was evaluated by the electron beam irradiation for magnetic domain refining. Pieces (15 mm in width) cut from the grain oriented electrical steel sheets were arranged and were irradiated one time with an electron beam for magnetic domain refining. The area percentage of the consequent exfoliation on the surface of the grain oriented electrical steel sheet was measured. Here, the electron beam used to cause exfoliation had a beam diameter of about 0.3 mm, and the current was 16 mA. In the determination of the area percentage of exfoliation, CL images taken with a magnification of 50 were used. Of the CL image of the region irradiated with the electron beam, a portion with a width of 0.3 mm (and a length of about 2.3 mm) corresponding to a width equal to the electron beam diameter, was binarized. With respect to the binarized CL image, the area percentage of dark parts, namely, parts in which the film had been exfoliated, was calculated as the film exfoliation rate. The adhesion was evaluated as acceptable when the area percentage of exfoliation was not more than 14%. Each sample was analyzed with respect to three fields of view, and the results were averaged. The results are described in Table 1.

As shown in Table 1, examples of the disclosed embodiments in which the area percentage of defective parts such as streaks on the forsterite film was in the range of the disclosed embodiments resulted in an area percentage of film exfoliation of not more than 14% and thus attained high film adhesion. When the area percentage of defective parts was not less than 0.1%, the area percentage of film exfoliation was not more than 10% and thus higher film adhesion was obtained. As mentioned above, the film evaluation method of the disclosed embodiments can evaluate the levels of film adhesion in a non-destructive and simple manner.

TABLE 1

| Sample No. | Number of fibers on coater (fibers/cm) | Area percentage of defective parts on film (%) | Area percentage of exfoliation by electron beam irradiation (%) | Remarks |
| --- | --- | --- | --- | --- |
| 1 | — | 0.02 | 11.0 | Example |
| 2 | 1 | 0.11 | 8.0 | Example |
| 3 | 2 | 0.38 | 5.6 | Example |
| 4 | 3 | 0.84 | 0.8 | Example |
| 5 | 4 | 1.32 | 3.2 | Example |
| 6 | 5 | 1.45 | 9.0 | Example |
| 7 | 6 | 1.79 | 21.2 | Comparative example |
| 8 | 8 | 2.21 | 55.7 | Comparative example |

Example 2

EXAMPLE 2 corresponds to the second embodiment.

Cold-rolled steel sheets having a sheet thickness of 0.27 mm and a Si content of 3 mass % were subjected to decarburization annealing which also served as recrystallization annealing. Next, an annealing separator based on MgO was applied onto the surface by a spray method, and the steel sheet was coiled into a coil. Final finishing annealing was performed for the coil to form a forsterite film. Next, a phosphate based tension coating was applied with a thickness of approximately 2 μm, and the steel sheet was annealed. During this process, subscales were formed in various states by changing the decarburization annealing conditions. In this manner, samples differing in the amount of forsterite and the forsterite film adhesion were produced.

The grain oriented electrical steel sheets obtained above were analyzed to measure CL spectra using the following apparatus and measurement conditions.
Apparatus: SEM (S-4300SE, Hitachi)
Spectrometer-related items (manufactured by Atago Bussan)
Spectrometer: diffraction grating HR-320 (visibility 100 gr/mm)
(Conditions)
Accelerating voltage (application current): 25 kV (41 nA)
Measurement area: 100 μm square
Measurement temperature: ambient
Measurement wavelength range: 200 to 1000 nm
Measurement time: 200 ms/point The height intensity ratio Ia/Ic of emission peak A to emission peak C was determined with respect to a CL spectrum obtained by averaging the results of five fields of view.

Separately, the samples were soaked in an alkaline solution to remove the tension coating layer and the amount of the forsterite film was determined in terms of the amount of oxygen by an oxygen analysis method in which the oxygen concentration was measured by a combustion infrared method. Further, the film adhesion was evaluated by an adhesion test (or peeling test) and also by determining the area percentage of film exfoliation caused by electron beam irradiation (corresponding to the electron beam irradiation for magnetic domain refining treatment).

Here, the adhesion test (or peeling test) was performed in the following manner. The electric steel sheet was subjected to a bend test (in which the steel sheet was wrapped around various cylindrical rods having different diameters, and the film adhesion was evaluated based on the minimum bending diameter (diameter) which did not cause an exfoliation of the film), and the indicator of adhesion properties was evaluated on a 3-level scale based on the diameter of curvature R at the occurrence of exfoliation. The larger the value of the indicator of adhesion properties is, the lower the adhesion properties are. The mark "◯" indicates that R was 30 mm or less, "Δ" indicates that R was more than 30 mm and not more than 40 mm, and "x" indicates that R was greater than 40 mm.

Figure 12:
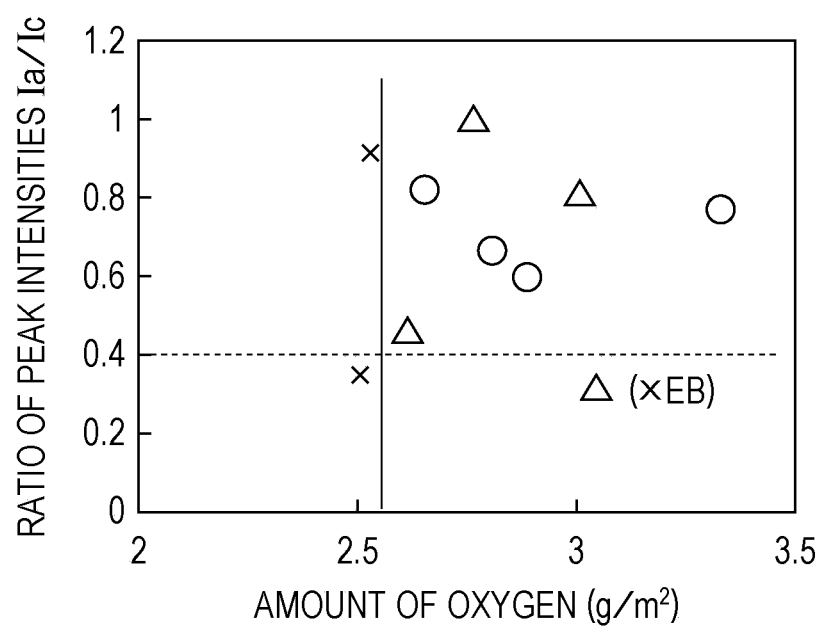
FIG. 12 is a diagram illustrating relationships between the height intensity ratio of emission peak A to emission peak C, and the amount of oxygen in Examples.

The area percentage of film exfoliation caused by electron beam irradiation was determined in the following manner. The grain oriented electrical steel sheet was irradiated with an electron beam for magnetic domain refining, and the area percentage of the consequent exfoliation of the forsterite layer was measured. The electron beam was irradiated at an accelerating voltage of 60 kV (electron beam diameter: 300 μm, current: 16 mA) while performing scanning. After the electron beam irradiation to the grain oriented electrical steel sheet, a CL image of the forsterite layer was obtained on SEM at an accelerating voltage of 30 kV. The image was binarized, and the area percentage of exfoliation was determined. The area percentage of exfoliation was expressed relative to an area which extended 2.3 mm in the electron beam scanning direction and 300 μm in the direction perpendicular thereto. The adhesion was evaluated as "◯" when the area percentage of the exfoliation of the forsterite film was less than 10%, "Δ" when the area percentage was 10% to 20%, and "x" when the area percentage was above 20%. Some of the samples showed a certain level of adhesion properties in the bend test but deteriorated the adhesion properties when irradiated with the electron beam. In this case, the result shown in FIG. 12 is followed by (×EB). FIG. 12 illustrates relationships between the height intensity ratio of the emission peak A to the emission peak C, and the amount of oxygen. The results of the adhesion evaluation are shown alongside the data points.

From FIG. 12, grain oriented electrical steel sheets which have good film adhesion, in particular when irradiated with an electron beam, can be identified and distinguished from steel sheets poor in adhesion properties by evaluating, as the indicators, whether or not the height ratio Ia/Ic of the emission peak A to the emission peak C is not less than 0.4 and the amount of oxygen is not less than 2.6 g/m$^2$.

The grain oriented electrical steel sheets of examples of the disclosed embodiments satisfying the above indicators have high film adhesion. In particular, these steel sheets can maintain high film adhesion even when irradiated with an electron beam to refine their magnetic domains. The absence of damage by the beam irradiation eliminates the need of recoating. Thus, it has been shown that grain oriented electrical steel sheets which provide a markedly reduced iron loss by magnetic domain refining treatment can be obtained at low costs.

The invention claimed is:

1. A grain oriented electrical steel sheet having a steel sheet and a forsterite film formed on a surface of the steel sheet,
wherein:
a total area percentage of defective parts scattered on the forsterite film is in the range of 0.1% to less than 1.5% relative to a surface area of the forsterite film when viewed from above the surface, and
the defective parts do not include a film defect having a visually recognizable size, the visually recognizable size being defined as a circular, elliptical, or similar amorphous defect having an equivalent circular diameter of greater than 200 μm.

2. The grain oriented electrical steel sheet according to claim 1, wherein at least part of the defective parts is streaky.

3. The grain oriented electrical steel sheet according to claim 1, wherein a surface of the grain oriented electrical steel sheet is treated with magnetic domain refining treatment.

4. An iron core comprising layers of the grain oriented electrical steel sheet according to claim 1.

5. A method for manufacturing the grain oriented electrical steel sheet of claim 1, having a steel sheet and a forsterite film formed on a surface of the steel sheet, the method comprising:
screening the grain oriented electrical steel sheet based on whether the total area percentage of defective parts scattered on the forsterite film when viewed from above the surface is within the range of 0.1% to less than 1.5%.

6. The method for manufacturing a grain oriented electrical steel sheet according to claim 5, further comprising performing magnetic domain refining treatment on the surface of the grain oriented electrical steel sheet determined to be acceptable in the screening step.

* * * * *